(12) United States Patent
Levay et al.

(10) Patent No.: US 10,395,863 B2
(45) Date of Patent: Aug. 27, 2019

(54) MAGNETIC ROTARY DIAL

(71) Applicant: DENSO International America, Inc., Southfield, MI (US)

(72) Inventors: Christopher Levay, Grand Rapids, MI (US); Christopher Guzman, Saint Clair Shores, MI (US)

(73) Assignee: DENSO International America, Inc., Southfield, MI (US)

( * ) Notice: Subject to any disclaimer, the term of this patent is extended or adjusted under 35 U.S.C. 154(b) by 0 days.

(21) Appl. No.: 15/824,457

(22) Filed: Nov. 28, 2017

(65) Prior Publication Data

US 2019/0164705 A1    May 30, 2019

(51) Int. Cl.
*H01H 19/54* (2006.01)
*G05G 1/10* (2006.01)
*G05G 5/06* (2006.01)
*B60K 37/06* (2006.01)

(52) U.S. Cl.
CPC ............... *H01H 19/54* (2013.01); *G05G 1/10* (2013.01); *G05G 5/06* (2013.01); *B60K 37/06* (2013.01); *B60K 2350/102* (2013.01)

(58) Field of Classification Search
CPC ....... H01H 2003/506; H01H 2025/043; H01H 2221/04; H01H 2215/042; H01H 36/0006; H01H 19/11; H01H 25/06; H01H 2003/008; H01H 25/04; H01H 25/065; H01H 25/008; H01H 5/02; H01H 19/14; H01H 36/00; H01H 3/022; H01H 3/42; H01H 1/54; H01F 7/0252; H01F 7/02; H01F 7/0242; H01F 7/0257; H01F 7/04; H01F 7/0247; H01F 7/0268; H01F 7/122
USPC .......... 200/12, 404; 345/184, 164, 167, 111; 335/207, 228, 285, 288
See application file for complete search history.

(56) References Cited

U.S. PATENT DOCUMENTS

| | | |
|---|---|---|
| 5,977,888 A | 11/1999 | Fujita et al. |
| 6,707,360 B2 | 3/2004 | Underwood et al. |
| 6,922,123 B2 | 7/2005 | Lalonde et al. |
| 7,124,648 B2 | 10/2006 | Shibazaki et al. |
| 7,236,158 B2 | 6/2007 | Iisaka et al. |
| 7,417,422 B2 | 8/2008 | Kang |
| 7,860,237 B2 | 12/2010 | Takashima et al. |
| 8,130,123 B2 | 3/2012 | Inoue et al. |
| 8,184,023 B2 | 5/2012 | Naka et al. |
| 8,378,858 B2 | 2/2013 | Sadamori et al. |
| 8,390,275 B2 | 3/2013 | Inoue et al. |
| 9,437,357 B2 | 9/2016 | Furuki et al. |
| 2004/0056842 A1* | 3/2004 | Iisaka ................. G06F 3/03549 345/167 |
| 2009/0073145 A1 | 3/2009 | Inoue et al. |
| 2013/0113465 A1 | 5/2013 | Padilla |
| 2014/0372124 A1 | 12/2014 | Thizon |
| 2016/0347178 A1 | 12/2016 | Ha |

\* cited by examiner

*Primary Examiner* — Ahmed M Saeed

(57) ABSTRACT

The present disclosure includes a rotary dial assembly having a holder and a dial portion rotatably coupled to the holder. A plurality of dial magnets are fixed to the dial portion. A holder magnet is on a side of the holder opposite to the dial portion. The holder magnet is configured to attract or repel the plurality of dial magnets as the dial portion is rotated to resist rotation of the dial portion.

15 Claims, 9 Drawing Sheets

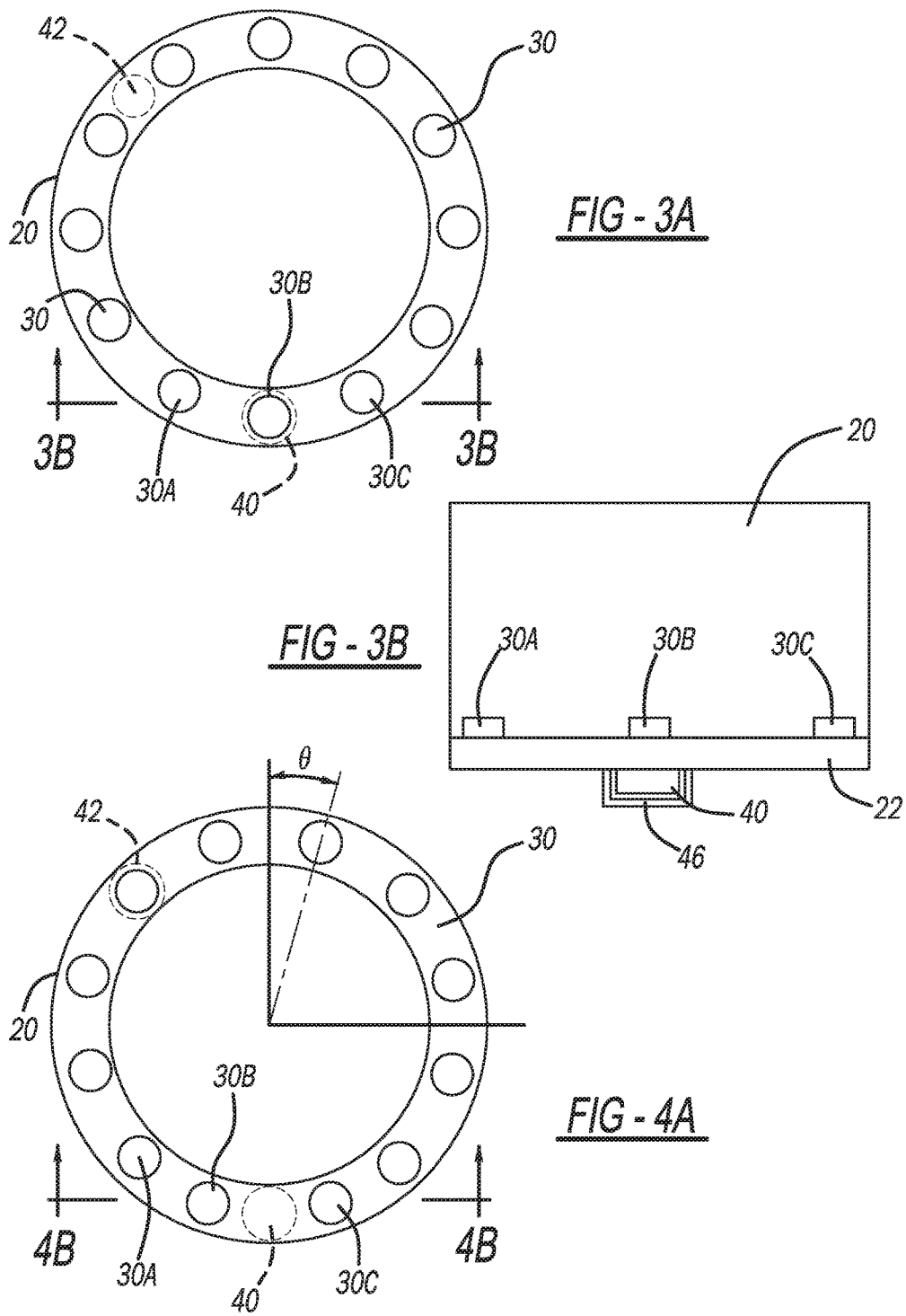

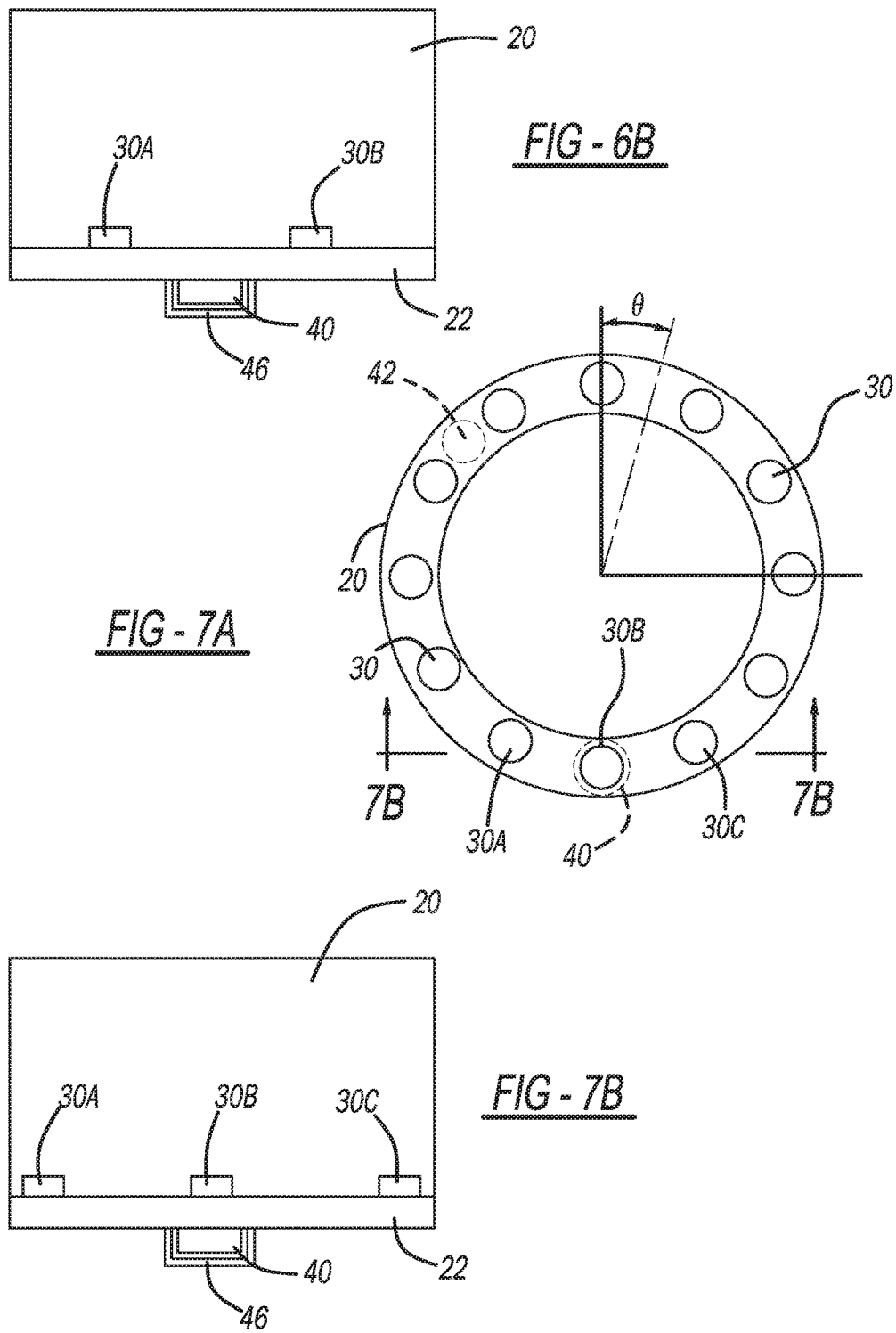

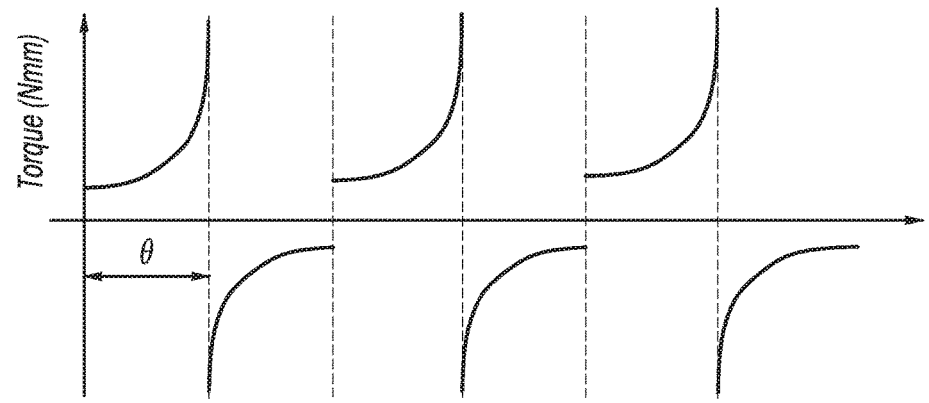
FIG-8
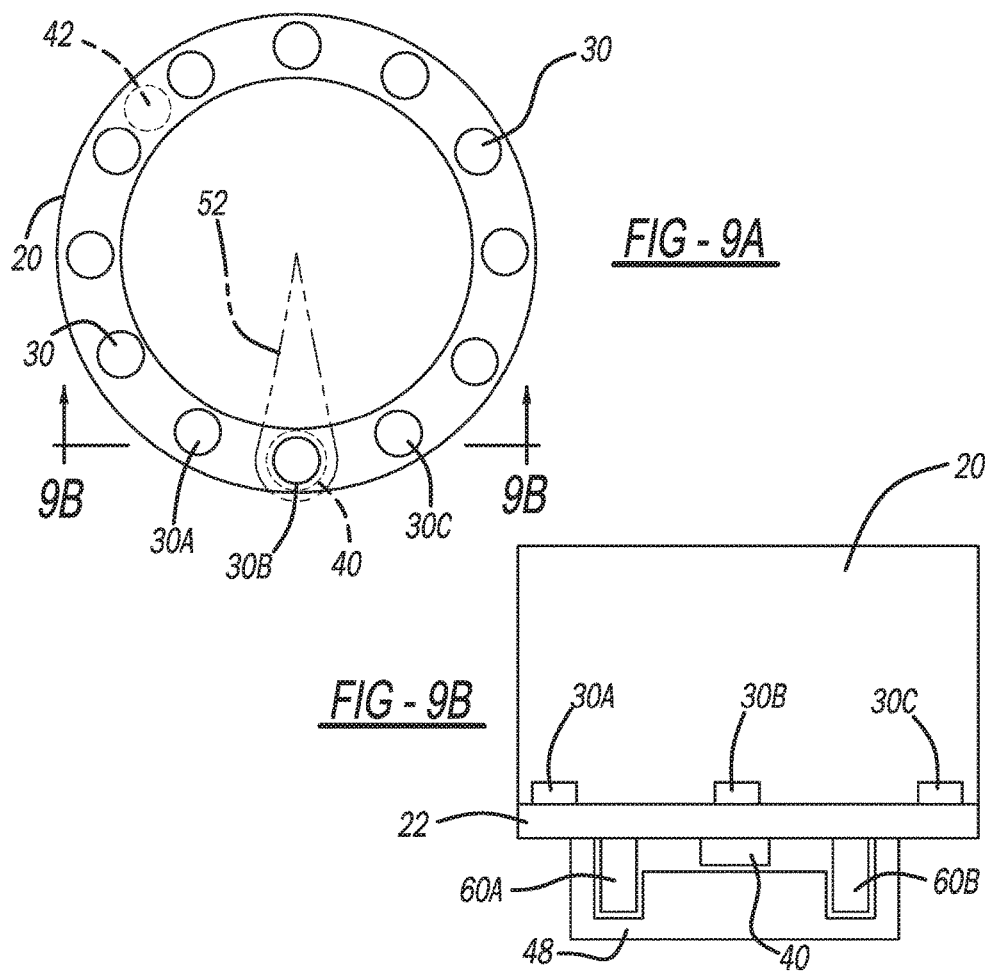
FIG-9A
FIG-9B

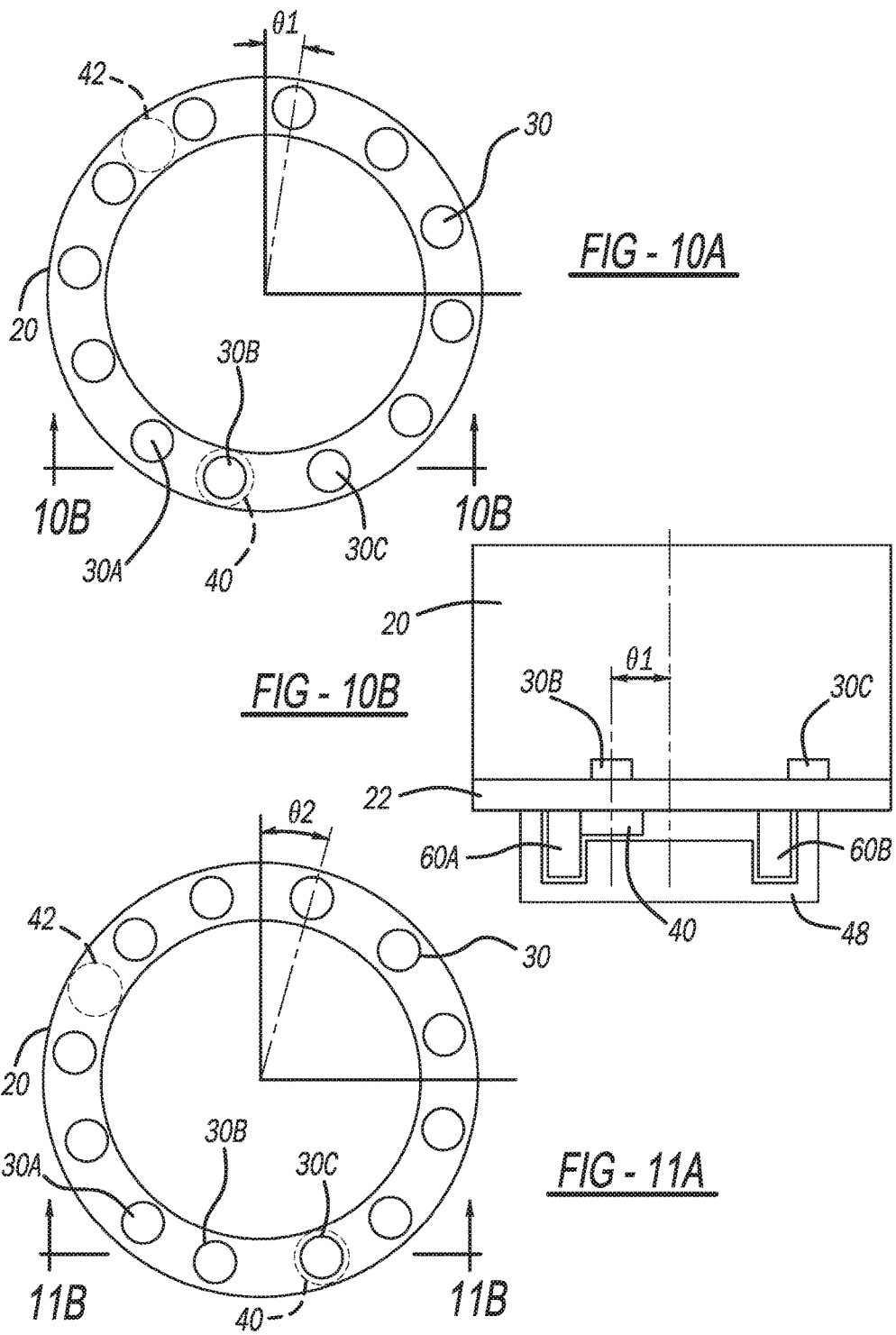

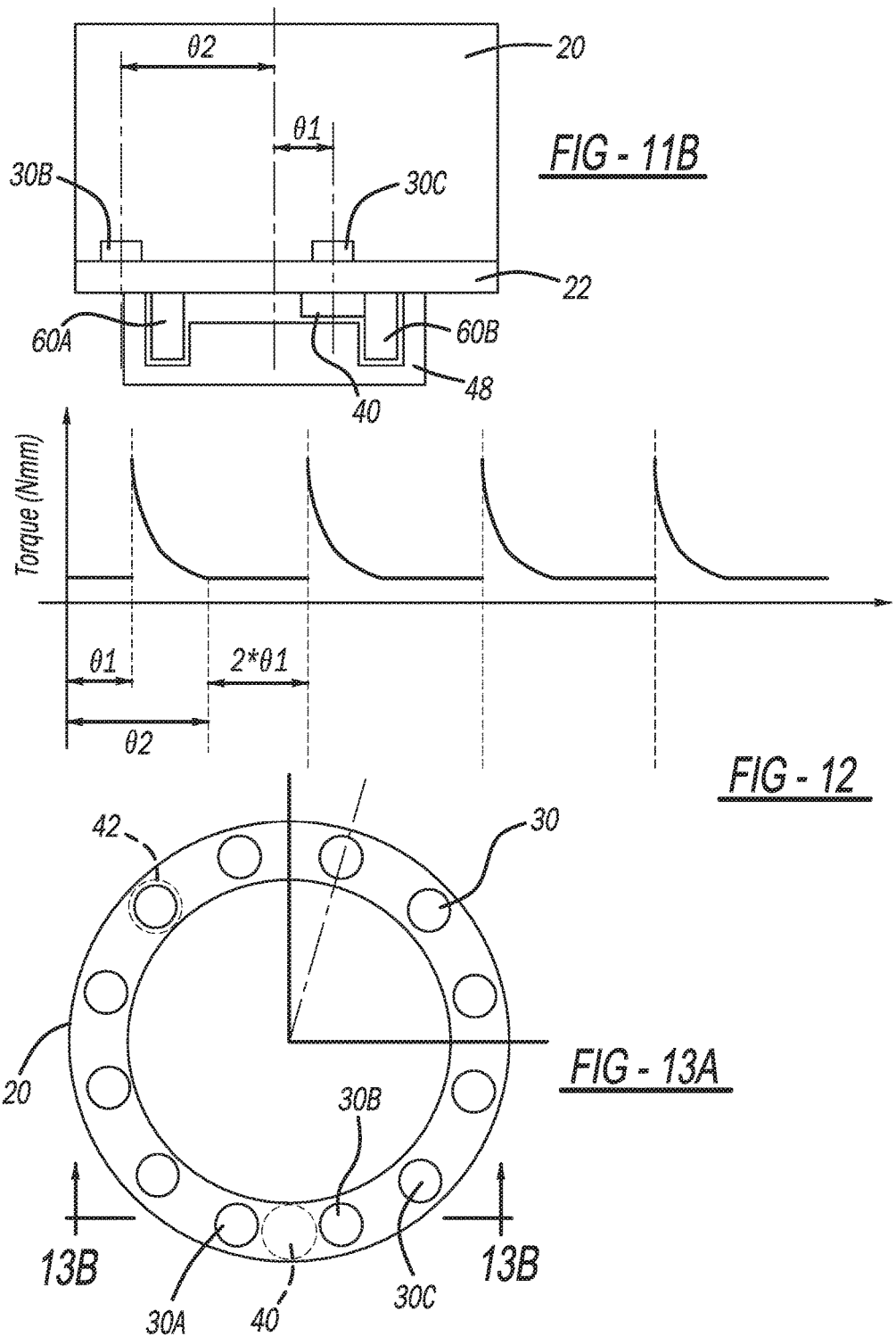

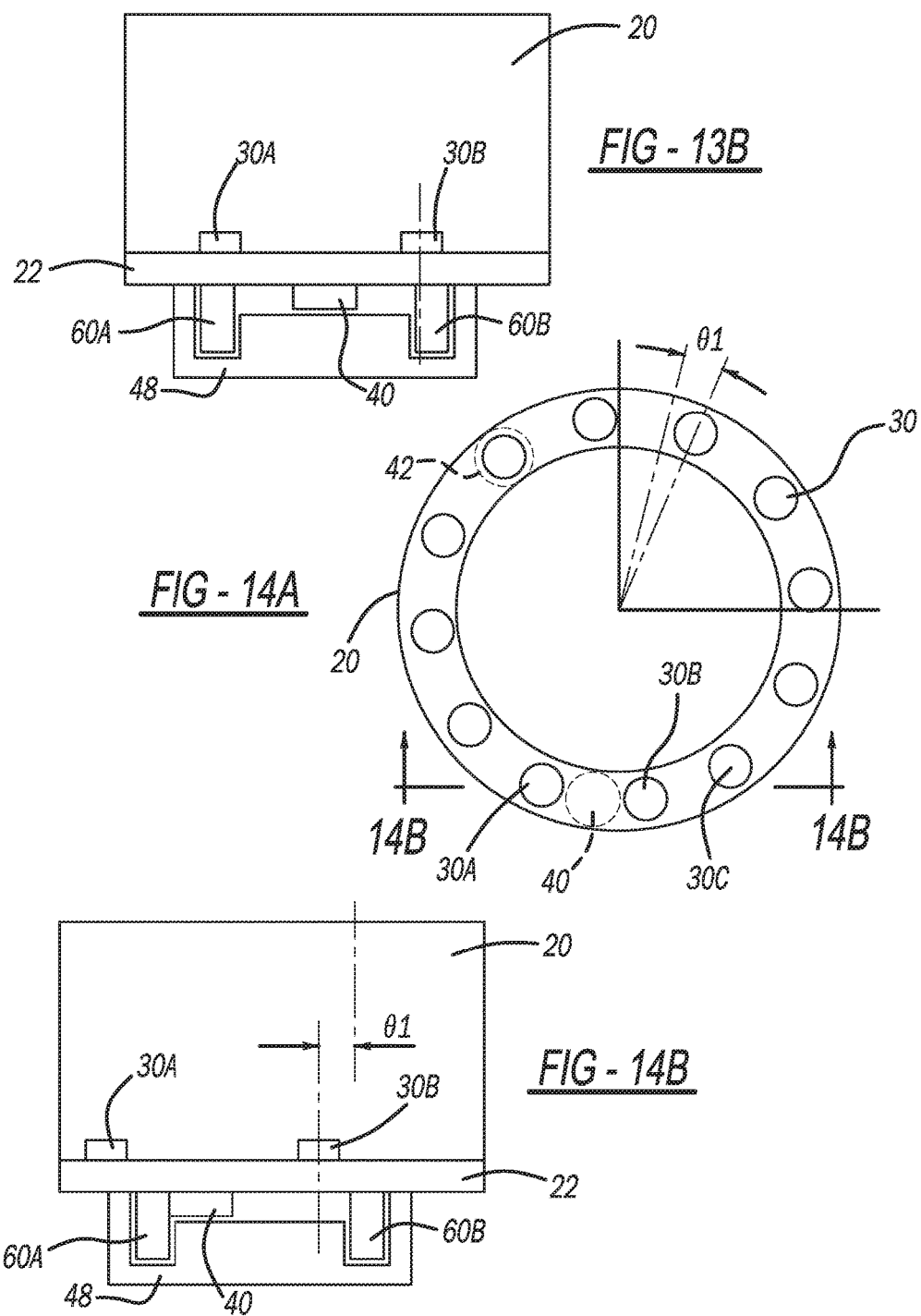

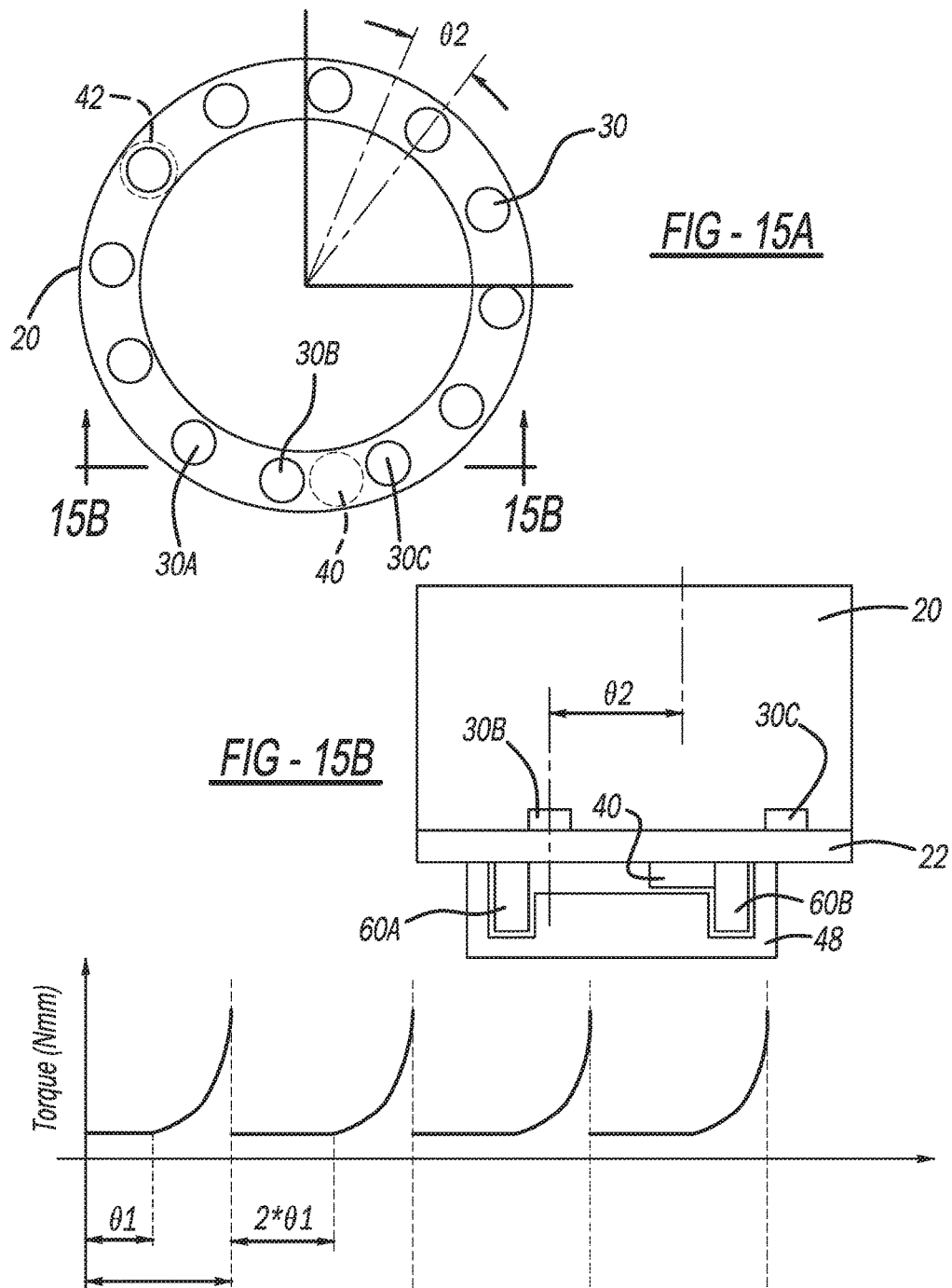

MAGNETIC ROTARY DIAL

FIELD

The present disclosure relates to a control dial having multiple torque and detent profiles.

BACKGROUND

This section provides background information related to the present disclosure, which is not necessarily prior art.

Rotary dials are often used in vehicles to provide control over various vehicle functions, such as heating, ventilation, and air cooling functions (HVAC), and entertainment system functions, such as volume control. While current rotary dials are suitable for their intended use, they are subject to improvement. The present disclosure provides for improved rotary dials, each of which advantageously provides multiple torque and detent profiles. The rotary dials according to the present disclosure include numerous additional advantages, as explained herein and as one skilled in the art will recognize.

SUMMARY

This section provides a general summary of the disclosure, and is not a comprehensive disclosure of its full scope or all of its features.

The present disclosure includes a rotary dial assembly having a holder and a dial portion rotatably coupled to the holder. A plurality of dial magnets are fixed to the dial portion. A holder magnet is on a side of the holder opposite to the dial portion. The holder magnet is configured to attract or repel the plurality of dial magnets as the dial portion is rotated to resist rotation of the dial portion.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

FIG. 3A illustrates interaction between dial magnets and holder magnets of the rotary dial assembly of the present disclosure;

FIG. 3B is a cross-sectional view taken along line 3B-3B of FIG. 3A;

FIG. 4A illustrates interaction between the dial magnets and the holder magnets of FIG. 3A when a dial of the rotary dial assembly has been rotated;

FIG. 6B is a cross-sectional view taken along line 6B-6B of FIG. 6A;

FIG. 7A is similar to FIG. 6A, but with the dial rotated angle θ;

FIG. 7B is a cross-sectional view taken along line 7B-7B of FIG. 7A;

FIG. 8 illustrates torque force required to rotate the dial of the rotary dial assembly when the holder magnets and the dial magnets are configured to repel each other, and arranged as illustrated in FIGS. 6A, 6B, 7A, and 7B;

FIG. 9A illustrates interaction between dial magnets and one or more holder magnets magnetized such that the holder magnets are attracted to the dial magnets, the holder magnets are slidably affixed at the holder;

FIG. 9B is a cross-sectional view taken along line 9B-9B of FIG. 9A;

FIG. 10A is similar to FIG. 9A, but with the dial rotated angle 81;

FIG. 10B is a cross-sectional view taken along line 10B-10B of FIG. 10A;

FIG. 11A is similar to FIG. 10A, but rotated further by angle θ2;

FIG. 11B is a cross-sectional view taken along line 11B-11B of FIG. 11A;

FIG. 12 illustrates torque force required to rotate the dial of the rotary dial assembly when the holder magnets and the dial magnets are configured to be attracted to each other, and arranged as illustrated in FIGS. 9A, 9B, 10A, 10B, 11A, and 11B;

FIG. 13A illustrates interaction between dial magnets and one or more holder magnets magnetized such that the holder magnets and the dial magnets repel each other, the holder magnets slidably affixed at the holder;

FIG. 13B is a cross-sectional view taken along line 13B-13B of FIG. 13A;

FIG. 14A is similar to FIG. 13A, but with the dial rotated angle 81;

FIG. 14B is a cross-sectional view taken along line 14B-14B of FIG. 14A;

FIG. 15A is similar to FIG. 14A, but rotated further by angle θ2;

FIG. 15B is a cross-sectional view taken along line 15B-15B of FIG. 15A; and

FIG. 16 illustrates torque force required to rotate the dial of the rotary dial assembly when the holder magnets and the dial magnets are configured to repel each other, and arranged as illustrated in FIGS. 13A, 13B, 14A, 14B, 15A, and 15B.

Corresponding reference numerals indicate corresponding parts throughout the several views of the drawings.

DETAILED DESCRIPTION

Example embodiments will now be described more fully with reference to the accompanying drawings.

Figure 1:
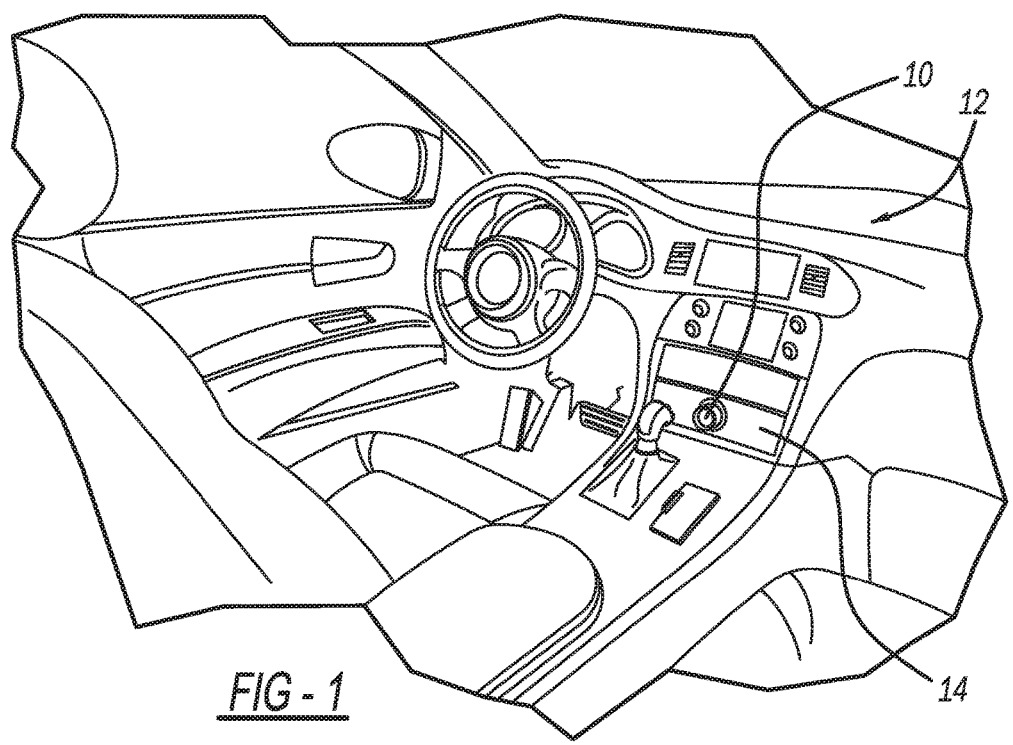
FIG. 1 illustrates a rotary dial assembly in accordance with the present disclosure included with an exemplary user interface of a vehicle passenger cabin.

FIG. 1 illustrates a rotary dial assembly 10 in accordance with the present disclosure. In the example illustrated, the rotary dial assembly 10 is included with a user interface of a vehicle cabin 12, and specifically at a center console 14 of the vehicle cabin 12. Although the rotary dial assembly 10 is described herein as being used in a vehicle cabin 12, the rotary dial assembly 10 can be used in any other suitable application to control features of any suitable control system. With respect to vehicle applications, the rotary dial assembly 10 can be included with an automobile control system for controlling any suitable functions, such as, but not limited to, a vehicle entertainment system, vehicle settings including vehicle drive settings, and/or a vehicle heating, ventilation, and air conditioning (HVAC) system. The rotary dial assembly 10 can be configured to control multiple devices or features of any suitable system. For example and with respect to an HVAC system, the rotary dial assembly 10 can control fan speed settings, temperature settings, and airflow direction.

Figure 2:
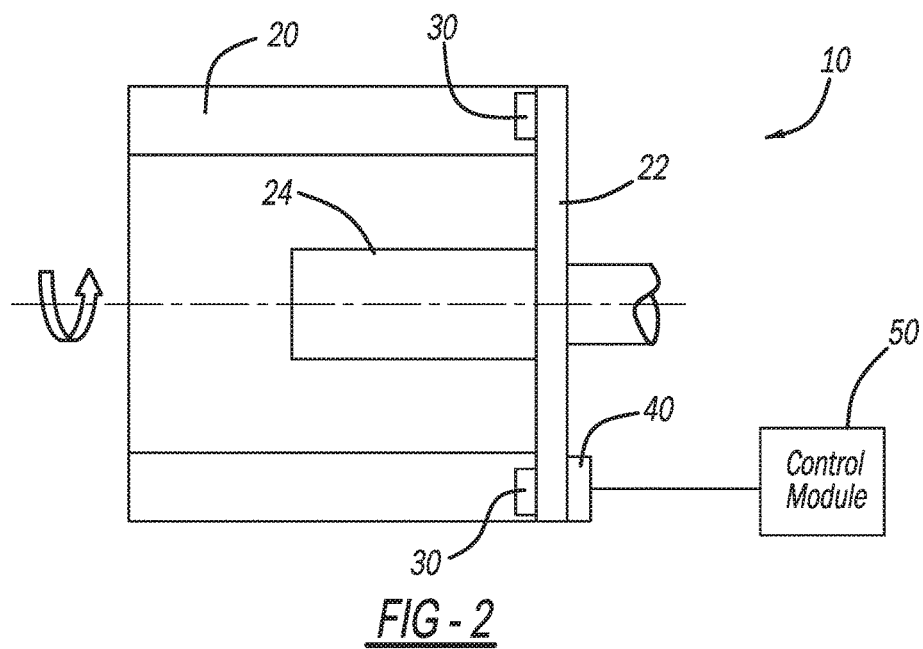
FIG. 2 is a cross-sectional view of the rotary dial assembly of FIG. 1.
Figure 4B:
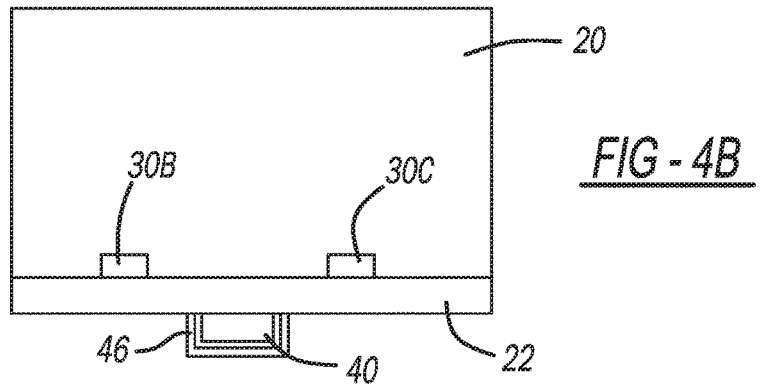
FIG. 4B is a cross-sectional view taken along line 4B-4B of FIG. 4A.

With additional reference to FIG. 2, the rotary dial assembly 10 includes a dial portion 20 and a holder 22. The dial 20 is rotatably connected to the holder 22 in any suitable manner. For example, the assembly 10 can include a post 24 to which the dial 20 is rotatably connected to. The post 24 can be connected to the holder 22. The dial 20 can be grasped and rotated to select various functions and/or enter various settings, such as a target temperature setting, fan speed setting, airflow direction, entertainment system/radio volume, etc.

With continued reference to FIG. 2, and additional reference to FIGS. 3A and 3B, the dial 20 includes a plurality of dial magnets 30, which can be evenly spaced apart about a lower (inner) surface of the dial 20, as illustrated in FIG. 3A, for example. Mounted at the holder is one or more holder electromagnets. Any suitable number of holder electromagnets can be mounted at the holder, including a first electromagnet 40 and a second electromagnet 42. The holder electromagnets 40/42 may be rigidly fixed at the holder 22 in any suitable manner. For example, a magnet retainer 46 can be attached to the holder 22 in any suitable manner, such as by snap tabs, heat stakes, screws, etc. The magnet retainer 46 can be made of any suitable material, such as a plastic material (PC, ABS, PP, etc.). The magnet retainer 46 sandwiches the magnet 40/42 between the retainer 46 and the holder 22, not allowing the magnet 40/42 to move. The holder electromagnets 40/42 may also be slidably mounted at the holder 22, as explained in conjunction with the additional configurations described herein.

The holder electromagnets 40/42 can be activated and deactivated by any suitable control module 50. In this application, including the definitions below, the term "module" may be replaced with the term "circuit." The term "module" may refer to, be part of, or include processor hardware (shared, dedicated, or group) that executes code and memory hardware (shared, dedicated, or group) that stores code executed by the processor hardware. The code is configured to provide the features of the modules and systems described herein. The term memory hardware is a subset of the term computer-readable medium. The term computer-readable medium, as used herein, does not encompass transitory electrical or electromagnetic signals propagating through a medium (such as on a carrier wave). The term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The holder electromagnets 40/42 can be individually activated and deactivated by the control module 50 in order to vary the torque profile ("click" positions) of the dial 20 based on the particular function that the rotary dial assembly 10 is configured to control. Arranging the holder electromagnets 40/42 such that the first holder electromagnet 40 is arranged opposite to one of the dial magnets 30 when the second holder electromagnet 42 is opposite to a gap or interval defined between the two of the dial magnets 30 will effectively increase the number of "click" positions of the dial 20 when both the first holder electromagnet 40 and the second holder electromagnet 42 are activated.

In the example of FIGS. 3A, 3B, 4A, 4B, and 5, the first holder electromagnet 40 is magnetized to attract the dial magnets 30 when the control module 50 activates the first holder electromagnet 40. Thus when a user rotates the dial 20 from the position illustrated in FIGS. 3A and 3B to the position illustrated in FIGS. 4A and 4B, thereby rotating the dial 20 by angle θ, the user must apply rotational torque sufficient to overcome the attractive magnetic force between the holder electromagnet 40 and the dial magnet 30B. The user must continue to apply rotational torque until the attraction between the holder magnet 40 and the dial magnet 30B is less than a magnetic attraction between the holder electromagnet 40 and the next dial magnet 30C (with respect to rotation of the dial 20 in a clockwise direction). Once the dial 20 is rotated slightly beyond angle θ, which is generally the halfway point between dial magnets 30B and 30C illustrated in FIGS. 4A and 4B, attraction between the holder magnet 40 and the dial magnet 30C will take over and cause rotation of the dial 20 until the dial magnet 30C is aligned opposite to the holder electromagnet 40.

Figure 5:
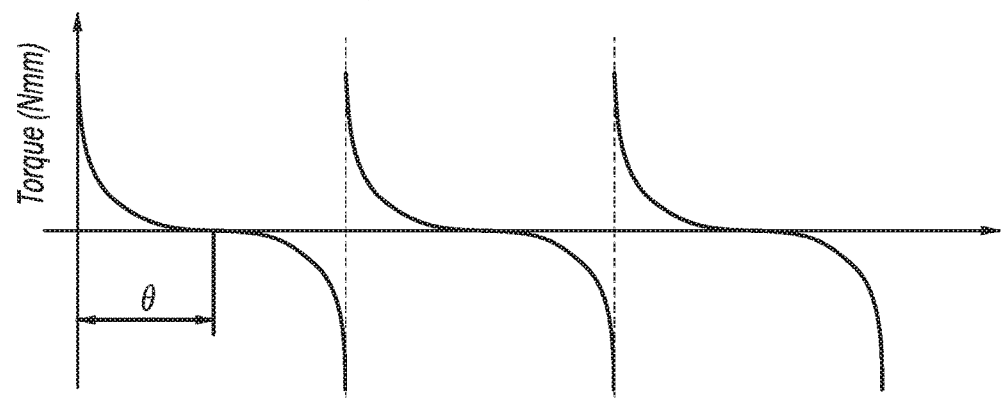
FIG. 5 illustrates torque force required to rotate the dial of the rotary dial assembly when the holder magnets and the dial magnets are configured to be attracted to each other, and arranged as illustrated in FIGS. 3A, 3B, 4A, and 4B.

FIG. 5 graphically illustrates the rotational torque required to rotate the dial 20 when only the first holder electromagnet 40 is activated by the control module 50. As illustrated, an ever decreasing amount of torque is required to rotate the dial 20 the distance measured by angle θ, which will generally position the holder electromagnet 40 midway between dial magnets 30B and 30C. Once the dial 20 is rotated slightly beyond angle θ, attraction between holder electromagnet 40 and dial magnet 30C takes over to rotate the dial 20 without the user having to exert any rotational torque on the dial 20 by the user.

Thus, when a dial magnet 30 is above the holder electromagnet 40, high torque is needed to rotate the dial 20. The further the dial is rotated, the larger the distance between the dial magnet 30 and the holder electromagnet 40, thereby reducing the torque required to rotate the dial 20. A snap-through point occurs when the holder electromagnet 40 is halfway between two of the dial magnets 30. At the snap-through point, no additional torque is required for rotation of the dial 20 because the dial will rotate itself due to magnetic attraction between the holder electromagnet 40 and the next dial magnet 30.

Rotation of the dial 20 from a first position where the holder electromagnet 40 is opposite to dial magnet 30B to a second position in which the holder electromagnet is opposite to dial magnet 30C constitutes a single "click" position. To increase the number of click positions of the rotary dial assembly 10, any suitable number of additional holder electromagnets can be included. For example, the second holder electromagnet 42 can optionally be included at the holder 22. The second holder electromagnet 42 is positioned opposite to a gap between neighboring dial magnets 30 when the first holder electromagnet 40 is directly opposite to one of the dial magnets 30, as illustrated in FIG. 3A. Thus when the dial 20 is rotated by angle θ so as to position the first holder electromagnet 40 generally equidistant between dial magnets 30, the second holder electromagnet 42 will be directly opposite to one of the dial magnets 30. The dial 20 will remain in the position of FIG. 4A until the dial 20 is further rotated so as to overcome the attraction between the second holder magnet 42 and the opposing dial magnet 30. Thus when both the first and second holder electromagnets 40 and 42 are present and activated by the control module 50, the number of "click" positions of the rotary dial assembly 10 will be effectively doubled.

By selectively activating one or both of the first and second holder electromagnets 40 and 42 (and/or any additional holder electromagnet), the control module 50 can effectively change the number "click" positions and torque profile of the rotary dial assembly 10 in order to customize the rotary dial assembly 10 for controlling particular functions. For example, when the dial 20 is used to control a function with a relatively fewer number of selectable options, the control module 50 will only activate the first holder electromagnet 40, and deactivate the second holder electromagnet 42. When the function to be controlled has a relatively greater number of options to be selected, the control module 50 will activate both the first and second holder electromagnets 40 and 42 to increase the number of "click" positions of the dial 20.

For example, when the rotary dial assembly 10 is used to control HVAC fan settings (of which there is a relatively small number of settings to select from), the control module 50 may activate only the first holder electromagnet 40, and not activate the second holder electromagnet 42. When the rotary dial assembly is used to set a target temperature of the HVAC (of which there is a relatively large temperature range to choose from), the control module 50 can activate both the first and second holder electromagnets 40 and 42. As another example, when the rotary dial assembly 10 is used for selecting satellite radio channels (of which there are many hundreds to select from) the control module 50 can activate both the first and second holder electromagnets 40 and 42 to make selection easier and more efficient (i.e., the dial 20 need not be rotated as far to change the channel from channel 1 to channel 50 as compared to when only the first holder electromagnet 40 is activated).

Figure 6A:
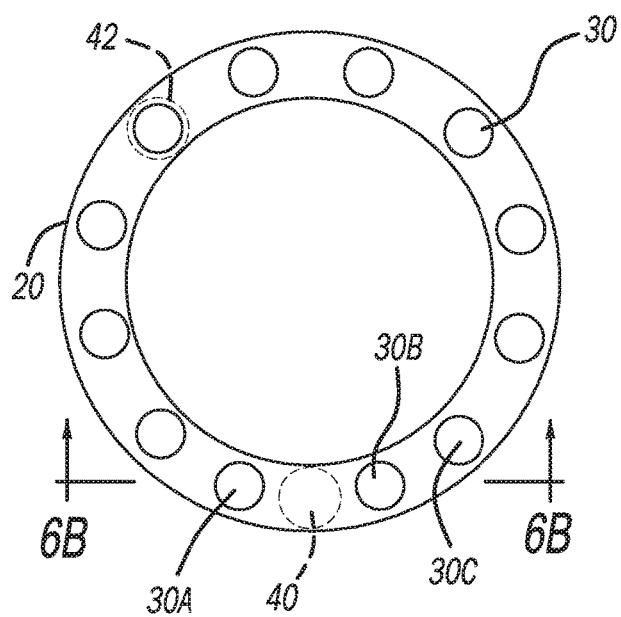
FIG. 6A illustrates interaction between the dial magnets and one or more holder magnets magnetized to repel one another.

With reference to FIGS. 6A, 6B, 7A, 7B, and 8, the holder electromagnet 40 can be magnetized so as to repel the dial magnets 30. Thus when no torque is applied to the dial 20, the holder electromagnet 40 will be arranged generally equidistant between dial magnets 30A and 30B, as illustrated in FIGS. 6A and 6B. To rotate the dial, rotational torque must be applied to the dial 20, as graphically illustrated in FIG. 8, until the dial magnet 30B passes beyond the holder electromagnet 40 in the clockwise direction, at which point the holder electromagnet 40 will repel the dial magnet 30B and force continued clockwise rotation of the dial 20 until the holder electromagnet 40 is arranged between the dial magnets 30B and 30C.

As with the example of FIGS. 3A-5 in which the holder electromagnet 40 is configured to attract the dial magnets 30, the rotary dial assembly 10 can include the second holder electromagnet 42 magnetized to repel the dial magnets 30. The second holder magnet 42 can be positioned, as illustrated in FIGS. 6A and 7A, such that the second holder magnet 42 is opposite to one of the dial magnets 30 when the first holder electromagnet 40 is opposite to an interval between two of the dial magnets 30. Thus when both the first and second holder electromagnets 40 and 42 are activated by the control module 50 the number of "click" positions of the dial 20 will be doubled. Any suitable number of additional holder electromagnets can be included to further increase the number of available "click" positions.

With reference to FIGS. 9A, 9B, 10A, 10B, 11A, 11B, and 12, the rotary dial assembly 10 can be configured such that the first holder electromagnet 40 (and any additional holder electromagnets, such as the second holder electromagnet 42) is slidably mounted to the holder 22 between a first stopper 60A and a second stopper 60B. The holder electromagnet 40 can be slidably mounted in any suitable manner. Slidably mounting the holder electromagnet 40 provides numerous advantages, such as smoother rotation of the dial 20. The holder electromagnets 40/42 can be slidably mounted, for example, within an elongated (slightly curved) magnet retainer 48 (see FIGS. 9B, 10B, 11B, 13B, 14B, and 15B, for example). The elongated magnet retainer 48 can be attached to the holder 22 in any suitable manner, such as by snap tabs, heat stakes, screws, etc. The elongated magnet retainer 48 can be made of any suitable material, such as a plastic material (PC, ABS, PP, etc.). The elongated magnet retainer 48 sandwiches the magnet 40/42 between the retainer 46 and the holder 22, and allows the magnet 40/42 to slide within the elongated magnet retainer 48.

The holder electromagnet 40/42 can also be mounted on a rotation arm 52 (see FIG. 9A for example). The rotation arm 52 can be anchored at a rotational axis of the dial assembly 10 about which the dial portion 20 rotates. The rotation arm 52 will restrict movement of the holder electromagnet 40/42 except for sliding movement between stoppers 60A and 60B.

Sliding movement of the first holder electromagnet 40 when magnetized to attract the dial magnets 30 will now be described. As the dial 20 is rotated clockwise from the position illustrated in FIGS. 9A and 9B to the position illustrated in FIGS. 10A and 10B by distance θ1, the holder electromagnet 40 will slide towards and to the first stopper 60A along with rotational movement of the dial magnet 30B in the clockwise direction. As illustrated in FIG. 12, because the holder electromagnet 40 moves with the dial magnet 30B, a minimal amount of torque is required to rotate the dial 20. To rotate the dial 20 further in the clockwise direction by angle θ2, enough torque must be applied to overcome the attraction between the dial magnet 30B and the holder electromagnet 40, as graphically illustrated in FIG. 12. Continued rotation of the dial 20 requires a decreasing amount of torque, as illustrated in FIG. 12. When the dial 20 has been rotated far enough such that the attraction between the holder electromagnet 40 and the dial magnet 30B is less than attraction between the holder electromagnet 40 and the next dial magnet 30, the holder electromagnet 40 will slide towards and to the second stopper 60B and eventually be positioned opposite to the next dial magnet 30C at the next "click" position. The dial 20 can be rotated with relatively little torque as the holder magnet 40 moves from the second stopper 60B to the first stopper 60A a distance equal to about twice angle θ1 as the holder electromagnet 40 slides from second stopper 60B back to first stopper 60A along with rotational movement of the dial magnet 30C.

As with the examples set forth above, the second holder electromagnet 42 may be included in addition to the first holder electromagnet 40, and the second holder electromagnet 42 may also be mounted in a slidable manner. When both the first and second holder electromagnets 40 and 42 are activated by the control module 50, the number of "click" positions will be doubled. The second holder electromagnet 42 is arranged to be opposite to a gap between dial magnets 30 when the first holder electromagnet 40 is directly opposite to one of the dial magnets 30.

FIGS. 13A, 13B, 14A, 14B, 15A, 15B, and 16 illustrate another exemplary configuration of the dial assembly 10 in which the holder electromagnet 40 is magnetized so as to repel the dial magnets 30, and is slidably movable between the first stopper 60A and the second stopper 60B in the same manner described in the immediately preceding configuration. Thus when the dial 20 is at rest at a selected "click" position, the holder electromagnet 40 will be relatively equidistant between first and second dial magnets 30A and 30B, as illustrated in FIGS. 13A and 13B. With reference to FIGS. 14A and 14B, rotation of the dial 20 by angle θ1 requires relatively little torque (as illustrated in FIG. 16) because the holder electromagnet 40 slides towards the first stopper 60A and maintains its position opposite to the gap between the dial magnets 30A and 30B. With reference to FIGS. 15A and 15B, rotating the dial 20 further across distance θ2 in order to move the holder electromagnet 40 to the next "click" position opposite to a gap between dial magnets 30B and 30C requires additional torque, as graphically illustrated in FIG. 16. This additional torque is required to overcome the repelling magnetic force between the holder electromagnet 40 and the dial magnet 30B. As with the preceding examples, the second holder electromagnet 42 may be included to double the number of "click" positions when both the first and second holder electromagnets 40 and 42 are activated. Any suitable additional number of holder electromagnets may be included.

The present teachings advantageously provide for a rotary dial assembly 10 that can change its torque profile and "click" frequency based on the particular vehicle function that the rotary dial assembly 10 is being used to control. Thus multiple torque profiles can be felt from the same rotary dial assembly 10. This gives the user a unique dial feeling for each mode that is being adjusted. Also, the configurations in which the holder electromagnet 40/42 slides between first and second stoppers 60A and 60B advantageously provides a smoother rotating feeling with more compressed and sharp peak torque values, which provides more narrow and sharply defined detents.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A rotary dial assembly comprising:
a holder;
a dial portion rotatably coupled to the holder;
a plurality of dial magnets fixed to the dial portion;
a holder magnet on a side of the holder opposite to the dial portion; and
a pair of stoppers on a side of the holder opposite to the dial portion, the holder magnet is slidably movable between the pair of stoppers;
wherein the holder magnet is configured to attract or repel the plurality of dial magnets as the dial portion is rotated to resist rotation of the dial portion; and
wherein rotation of the dial portion and the plurality of dial magnets thereof forces the holder magnet against one of the pair of stoppers.

2. The rotary dial assembly of claim 1, wherein the holder magnet is slidably fixed to the holder by an elongated magnet retainer.

3. The rotary dial assembly of claim 1, wherein the holder includes a post extending therefrom, the dial portion is rotatably affixed to the post.

4. The rotary dial assembly of claim 1, wherein the holder magnet is an electromagnet configured to be activated and deactivated.

5. The rotary dial assembly of claim 1, wherein:
the holder magnet is a first holder magnet;
a second holder magnet is on the side of the holder opposite to the dial portion; and
the first and the second holder magnets are positioned such that when the first holder magnet is opposite to one of the plurality of dial magnets, the second holder magnet is opposite to an interval between two of the plurality of dial magnets.

6. The rotary dial assembly of claim 5, wherein each one of the first and the second holder magnets are configured to be individually activated or deactivated to vary a torque profile of the dial portion.

7. A rotary dial assembly comprising:
a holder;
a dial portion rotatably coupled to the holder, the dial portion including a plurality of dial magnets fixed thereto; and
a first holder electromagnet attached to the holder, and a second holder electromagnet attached to the holder, the first and the second holder electromagnets are arranged about the holder such that when the first holder electromagnet is opposite to one of the plurality of dial magnets the second holder electromagnet is opposite to a gap defined between two different ones of the plurality of dial magnets;
wherein:
the first and the second holder electromagnets are configured to attract or repel the plurality of dial magnets as the dial portion is rotated to resist rotation of the dial portion; and
the first and the second holder electromagnets are individually activated and deactivated by a control module based on a function to be controlled by the dial portion to change a torque profile of the dial portion.

8. The rotary dial assembly of claim 7, wherein the first holder electromagnet and the second holder electromagnet are stationary.

9. The rotary dial assembly of claim 7, wherein the first holder electromagnet and the second holder electromagnet are slidable.

10. The rotary dial assembly of claim 9, wherein the holder further includes a plurality of stoppers on a side of the holder opposite to the dial portion, each one of the first and second holder electromagnets is movable between different ones of the plurality of stoppers.

11. The rotary dial assembly of claim 10, wherein rotation of the dial portion and the plurality of dial magnets thereof forces the first and second holder electromagnets against different ones of the plurality of stoppers.

12. A method of changing a torque profile of a rotary dial assembly based on a function to be controlled by rotation of a dial portion of the rotary dial assembly, the method comprising:
setting the rotary dial at a first torque profile corresponding to a first function to be controlled by rotation of the dial portion by:
activating a first holder electromagnet of a holder to which the dial portion is rotatably coupled to, the dial portion includes a plurality of dial magnets fixed thereto; and
not activating a second holder electromagnet of the holder, the second holder electromagnet is opposite to a gap defined between two of the plurality of dial magnets when the first holder electromagnet is opposite to one of the plurality of dial magnets; and
setting the rotary dial at a second torque profile corresponding to a second function to be controlled by rotation of the dial portion by: activating the first holder electromagnet; and activating the second holder electromagnet.

13. The method of claim 12, wherein each one of the first holder electromagnet and the second holder electromagnet is activated to attract or repel the plurality of dial magnets.

14. The method of 12, wherein rotation of the rotary dial slidably moves the activated first holder electromagnet and the activated second holder electromagnet.

15. The method of claim 14, wherein the activated first holder electromagnet and the activated second electromagnet are moved against different stoppers of the holder.

* * * * *

UNITED STATES PATENT AND TRADEMARK OFFICE
CERTIFICATE OF CORRECTION

PATENT NO. : 10,395,863 B2
APPLICATION NO. : 15/824457
DATED : August 27, 2019
INVENTOR(S) : Christopher Levay et al.

Page 1 of 1

It is certified that error appears in the above-identified patent and that said Letters Patent is hereby corrected as shown below:

In the Claims

Column 10, Line 33: In Claim 12, after "by:", insert --¶--

Column 10, Line 34: In Claim 12, after "and", insert --¶--

Column 10, Line 39: In Claim 14, after "of", insert --claim--

Signed and Sealed this
Second Day of June, 2020

Andrei Iancu
*Director of the United States Patent and Trademark Office*